United States Patent [19]

Mizokami

[11] Patent Number: 4,512,648
[45] Date of Patent: Apr. 23, 1985

[54] PROGRAM TYPE AUTOMATIC EXPOSURE CONTROLLER FOR USE IN CAMERAS

[75] Inventor: Kazunori Mizokami, Hachioji, Japan

[73] Assignee: Olympus Optical Co., Ltd., Tokyo, Japan

[21] Appl. No.: 577,063

[22] Filed: Feb. 3, 1984

[30] Foreign Application Priority Data

Apr. 14, 1983 [JP] Japan .............................. 58-55970[U]

[51] Int. Cl.³ .............................................. G03B 7/08
[52] U.S. Cl. ................................................ 354/443
[58] Field of Search ........................ 354/441, 442, 443

[56] References Cited

U.S. PATENT DOCUMENTS 3,950,765  4/1976  Nanba et al. ......................... 354/443
3,964,073  6/1976  Kobori et al. ........................ 354/443
4,310,229  1/1982  Magel ................................... 354/443
4,345,829  8/1982  Shinbori et al. ..................... 354/443
4,352,548 10/1982  Toyoda ................................. 354/443
4,474,451 10/1984  Mizokami ............................. 354/443

FOREIGN PATENT DOCUMENTS 7515    1/1978  Japan ................................. 354/443
64373   5/1978  Japan ................................. 354/443
138431 10/1979  Japan ................................. 354/443

Primary Examiner—Russell E. Adams
Attorney, Agent, or Firm—Louis Weinstein

[57] ABSTRACT

A program type automatic exposure controller produces a selection signal in each of the film sensitivity information regions in response to information for a film sensitivity in said each of regions and changes a program constant in the aperture controller by the selection signal so that an aperture control for opening and closing a shutter may be conducted by a photometry operation of light reflected by the film surface after an aperture operation is completed.

3 Claims, 4 Drawing Figures

4,512,648

PROGRAM TYPE AUTOMATIC EXPOSURE CONTROLLER FOR USE IN CAMERAS

BACKGROUND OF THE INVENTION

The present invention relates to a program type automatic exposure controller for use in cameras, and more particularly, to such a controller which is selectively changeable to a plurality of program constants in a camera of the film surface reflection photometry type.

Recently, high sensitivity films have been developed and widely used and therefore information for a film sensitivity which is to be inputted into a camera covers an extensive range. Accordingly, in a program type automatic exposure camera, an exposure control by setting only one fixed program constant input thereinto over information for sensitivities of all kinds of films may be improperly conducted and hence a program constant requires changes in accordance with a variation in information for a film sensitivity.

In conventional program type automatic exposure controllers which are selectively changeable to a plurality of program constants, there have been well known such controllers that combinations of a plurality of program constants are previously stored and a photographer can timely select from the stored constant combination (U.S. Pat. Nos. 3,950,765 and 3,964,073) or in which the program constants are changeable based on information for a taking lens such as a focal length (Japanese Laid Open Patent Publication Nos. Sho 54-100724 and Sho 54-156533). However, a program type automatic exposure controller that can change program constants in response to information for a sensitivity of a film being used in a camera is not yet known.

SUMMARY OF THE INVENTION

In view of the foregoing, it is an object of the invention to provide a program type automatic exposure controller for use in a camera of the film surface reflection photometry type which determines a program constant suitable for one of the variable regions for information of a film sensitivity in accordance with said one of regions for information of the film sensitivity.

According to the invention, a range for setting information of a film sensitivity is divided into a plurality of regions and a program constant for an aperture control is changed in accordance with each of the regions for information of the film sensitivity so that even when a film of different sensitivity is used, the exposure control in combination with a proper aperture and shutter speed value may be always achieved merely setting a sensitivity of the film. This makes it possible to take a picture making the best use of a film property such as a normal sensitivity, a high sensitivity and the like.

DETAILED DESCRIPTION OF THE PREFERRED EMBODIMENT

Figure 1:
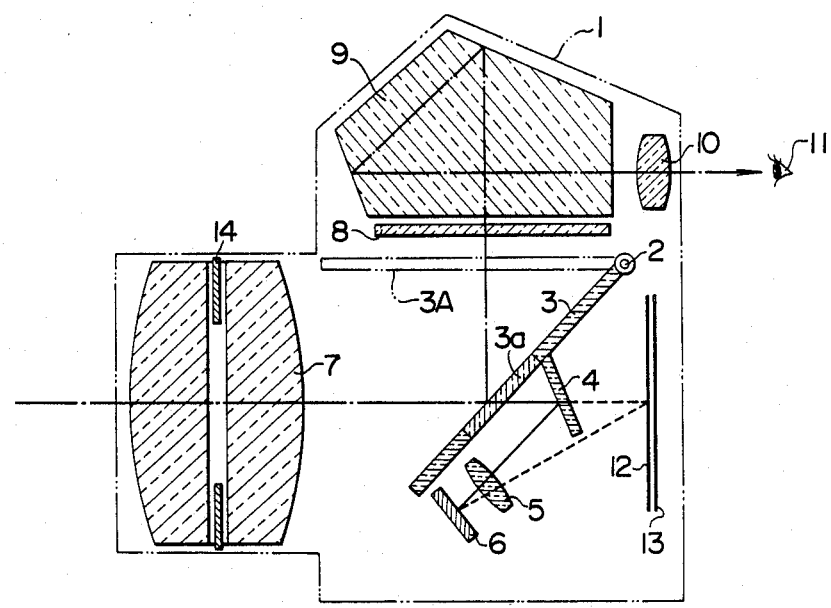
FIG. 1 is a schematic section view of a single-lens reflex camera of the film reflection photometry type to which a program type automatic exposure controller of the invention is applied.

Referring to FIG. 1, a mirror 4 for use in the photometry is fixed at the back of a movable mirror 3 provided for observation use and which is rotatably attached by a support pin 2 to a mirror box (not shown) within a camera body 1. A condenser lens 5 and a photoelectric transducer element 6 such as a silicon photodiode are disposed outside the taking optical path under the movable mirror 3. A light receiving plane of the transducer element 6 is opposed to a reflecting plane of the mirror 4 when the movable mirror 3 is lowered in a state inclined at 45° as shown in FIG. 1 and a front surface of a first shutter blind 12 of a focal plane shutter. Accordingly, light from an object being photographed which passes through a taking lens 7 and a diaphragm member 14 and is transmitted through a half mirror portion 3a of the movable mirror 3 is reflected by the mirror 4 and is projected on the light receiving plane of the transducer element 6 by the condenser lens 5. As a result, the light from the object being photographed, when the diaphragm member 14 is fully opened, is measured by the transducer element 6 before a shutter is released. Additionally, the light from the object being photographed which is reflected by the movable mirror 3 impinges on a photographer's eye 11 as observation light through a focusing screen 8, a pentagonal prism 9 and an eyepiece 10. Then, when the shutter is released, a stop-down operation of the diaphragm member 14 is initiated by an aperture control circuit. The amount of the stop-down of the diaphragm member 14, as will be described later, is automatically set based on the amount of light received by the transducer element 6, namely a brightness of the object being photographed and a film sensitivity. When the stop-down operation of the diaphragm member 14 is completed to the value to be set as the aperture control goes on, the movable mirror 3 is raised to a position 3A shown in FIG. 1 with a double dot-dash-line so that the observation optical path is closed by the movable mirror 3 and the taking optical path is opened. Whereupon, the first shutter blind 12 starts its running and hence light from the object being photographed is focused on the front surface of the first shutter blind 12 while in its running and therafter on the sensitive surface of a film 13 which is exposed as the first shutter blind 12 runs. Thus focused light is reflected by both of the surfaces of the first shutter blind 12 and the film 13 to impinge on the light receiving surface of the transducer element 6 through the condenser lens 5 so that the light from the object being photographed is measured by the transducer element 6 even after the shutter has been released.

Figure 2:
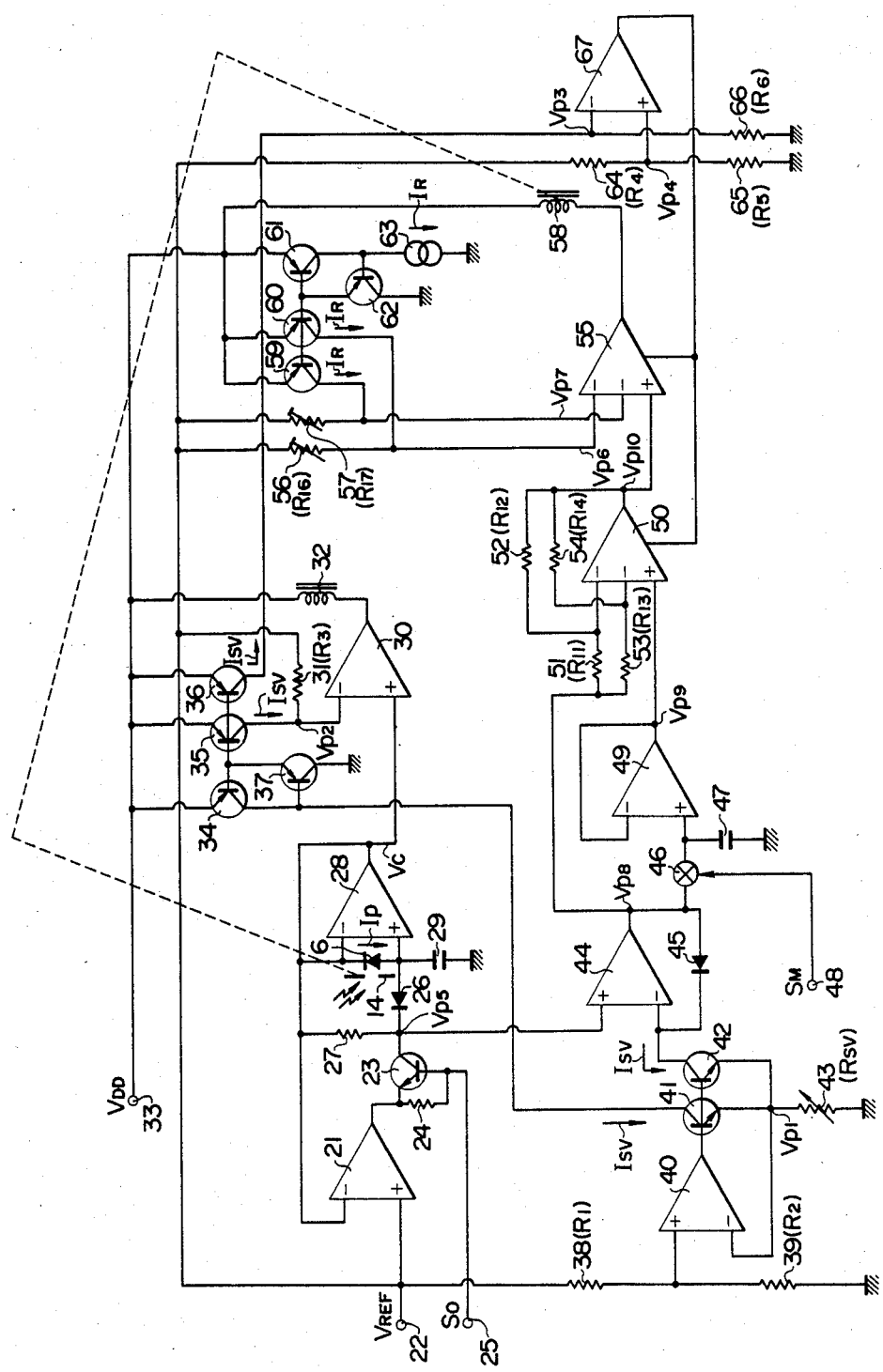
FIG. 2 is a circuit diagram of the program type automatic exposure controller illustrating an embodiment of the invention.

Referring now to FIG. 2, an operational amplifier 21 has its non-inverting input terminal connected to a terminal 22 to which a reference voltage $V_{REF}$ is applied and its output terminal connected to the emitter of an NPN transistor 23 which serves as a switching element and the base of the transistor 23 through a resistor 24. The base of the transistor 23 is also connected to a terminal 25 to which a trigger signal $S_O$ is applied which turns from an "H" level to an "L" level in synchronism with the initiation of running of the first shutter blind after the aperture control has been completed by the shutter release operation. The collector of the transistor 23 is connected to the cathode of a diode 26 for a logarithmic compression and an inverting input terminal of the amplifier 21 through a resistor 27. The anode of the diode 26 is connected to a non-inverting input terminal of an operational amplifier 28 for integration. The photoelectric transducer element 6 has its anode connected to the non-inverting input terminal of the amplifier 28 and its cathode connected to the inverting input terminal thereof. A capacitor 29 for integration is connected between the non-inverting input terminal of the amplifier 28 and the ground. The output terminal of the amplifier 28 is connected to the inverting input terminals of amplifiers 21 and 28 to form a feedback loop circuit therebetween and further to a non-inverting input terminal of an operational amplifier 30 for comparison which forms a comparator for an exposure control. The amplifier 30 has its inverting terminal connected through a resistor 31 to the terminal 22 for the reference voltage and its output terminal connected through an electromagnet 32 for locking a second shutter blind to a terminal 33 to which a supply voltage $V_{DD}$ is applied. PNP transistors 34, 35, 36 have their emitters connected to the terminal 33 and their bases connected to each other and to the emitter of a PNP transistor 37. The transistor 37 has its collector connected to the ground and its base connected to the collector of the transistor 34. These transistors 34 to 37 have the same properties and form a well known current mirror circuit. Accordingly, when a current flows through the collector of the transistor 34, the same amount of current will flow also through the collectors of the transistors 35, 36.

Resistors 38, 39 are connected in series between the terminal 22 and the ground and the junction between the resistors 38, 39 is connected to a non-inverting input terminal of an operational amplifier 40. An inverting input terminal of the amplifier 40 is connected to the emitters of NPN transistors 41, 42 which have the same properties and through a variable resistor 43 for setting information of a film sensitivity to the ground. The output terminal of the amplifier 40 is connected to the base of each of the transistors 41, 42. The collector of the transistor 41 is connected to the collector of the transistor 34 and the collector of the transistor 42 is connected to an inverting input terminal of an operational amplifier 44 in the next stage thereof. A diode 45 for a logarithmic compression which has the same properties as that of the diode 26 and is disposed between an inverting input terminal and the output terminal of the amplifier 44 has an anode connected to an output terminal of the latter. A non-inverting input terminal of the amplifier 44 is connected to the junction between the collector of transistor 23 and the diode 26. The amplifier 44 serves to combine and operate photographing information for a brightness Bv of an object being photographed and a film sensitivity Sv in order to control an aperture. The output terminal of the amplifier 44 is connected through a semiconductor analog switch 46 to a non-inverting input terminal of an operational amplifier 49 for an impedance conversion. The control terminal of the analog switch 46 is connected to a terminal 48 to which a memory signal $S_M$ is applied. The memory signal $S_M$ is at the "H" level before a shutter is released and turns to the "L" level in synchronism with the shutter release. A capacitor 47 connected between a non-inverting input terminal of operational amplifier 49 and the ground is charged by an output voltage of the amplifier 44 and stores the charged voltage at the same time when the analog switch 46 turns off. An inverting input terminal of the amplifier 49 is connected to the output terminal thereof which is connected a non-inverting input terminal of a three-input type operational amplifier 50 in the next stage of the amplifier 49. A resistor 51 is connected between a first inverting input terminal of the amplifier 50 and the output terminal of the amplifier 44 and a resistor 52 is connected between the first input terminal and the output terminal of the amplifier 50. A resistor 53 is connected between a second inverting input terminal of the amplifier 50 and the output terminal of the amplifier 44 and a resistor 54 is connected between the second input terminal and the output terminal of the amplifier 50. Resistors 51, 52 and 53, 54 determine the amplification of the amplifier 50 and these resistors and the amplifier 50 determine an inclination of the program characteristic for the aperture control. The output terminal of the amplifier 50 is connected to a non-inverting input terminal of a three-input type operational amplifier 55 for a comparison which forms a comparator for the aperture control. A first inverting input terminal of the amplifier 55 is connected through a semifixed resistor 56 for setting a decision voltage to initiate a stop-down operation of a taking lens to the terminal 22 for the reference voltage and a second inverting input terminal thereof is connected through a semifixed resistor 57 for setting a decision voltage in the same manner as the resistor 56 to the terminal 22. The output terminal of the amplifier 55 is connected through an electromagnet 58 for the aperture control to the terminal 33 for the power supply which is also connected to the emitters of PNP transistors 59, 60, 61. The bases of these transistors 59, 60, 61 are connected to each other and to the emitter of a PNP transistor 62. The collector of the transistor 62 is connected to the ground and the base thereof is connected to the collector of the transistor 61 and through a constant voltage supply 63 to the ground. These transistors 59 to 62 have the same properties to form a well known current mirror circuit. Thereby, when a constant current flows through the collector of the transistor 61 by means of the constant voltage supply 63, the same current flows also through the transistors 59, 60. The collector of the transistor 60 is connected to a first inverting input terminal of the amplifier 55 and the collector of the transistor 59 is connected to a second inverting input terminal of the amplifier 55.

The terminals for changing a bias of the amplifiers 50, 55 are connected to the output terminal of an operational amplifier 67 for a comparison which forms a comparator for changing a program constant by producing a selection signal in accordance with a region for information of a film sensitivity. Accordingly, the biases for the amplifiers 50, 55 are changed by a level of the selection signal which is produced from the amplifier 67 to select either the first or the second inverting input terminals of the amplifiers 50, 55. A non-inverting input terminal of the amplifier 67 is connected to the junction between resistors 64 and 65 for setting a decision voltage, which resistors are connected in series between the terminal 22 and the ground. An inverting input terminal of the amplifier 67 is connected to the collector of the transistor 36 and through a resistor 66 to the ground.

In operation, when a power supply switch for a camera of the film surface reflection photometry type including the program type automatic exposure controller is closed, the supply voltage $V_{DD}$ is applied to the terminal 33 and the reference voltage $V_{REF}$ is applied to the terminal 22. Prior to a photographing, the variable resistor 43 is set in accordance with information for a sensitivity of a film loaded in the camera by turning a dial for setting a film sensitivity. A voltage $V_{P1}$ between the variable resistor 43 and the junction between the transistors 41, 42, that is, a voltage at the inverting input terminal of the amplifier 40, which is equal to a voltage at the non-inverting input terminal threof, is expressed as follows:

$$V_{P1} = \frac{V_{REF} \cdot R_2}{R_1 + R_2} \quad (1)$$

where $R_1$ and $R_2$ represent the resistances of the resistors 38, 39, respectively. Accordingly, a current $I_{SV}$ flowing through each collector of the transistors 41, 42 is expressed as follows:

$$I_{SV} = \frac{V_{REF} \cdot R_2}{2R_{SV}(R_1 + R_2)} \quad (2)$$

where $R_{SV}$ represents the resistance of the variable resistor 43.

Since the current $I_{SV}$ flowing through the collector of the transistor 41 flows through the collector of the transistor 34, it flows also through the collectors of the transistors 35, 36. Since the current $I_{SV}$ flowing through the collector of the transistor 35 flows through the resistor 31 to the terminal 22, the following voltage $V_{P2}$ is applied to the inverting input terminal of the amplifier 30 as a decision voltage for a shutter speed:

$$V_{P2} = V_{REF} + I_{SV} \cdot R_3 \quad (3)$$

where $R_3$ represents the resistance of the resistor 31. In addition, since the current $I_{SV}$ flowing through the collector of the transistor 36 flows through the resistor 66, the following voltage $V_{P3}$ is applied to the inverting input terminal of the amplifier 67:

$$V_{P3} = I_{SV} \cdot R_6 \quad (4)$$

where $R_6$ represents the resistance of the resistor 66. Also, the following voltage $V_{P4}$ is applied to the non-inverting input terminal of the amplifier 67 as a decision voltage thereof:

$$V_{P4} = \frac{V_{REF} \cdot R_5}{R_4 + R_5} \quad (5)$$

where $R_4$ and $R_5$ represent the resistances of the resistors 64, 65, respectively. Accordingly, the amplifier 67 compares the voltages $V_{P3}$ and $V_{P4}$ and its output assumes the "L" level when $V_{P3} > V_{P4}$ and the "H" level when $V_{P3} \leq V_{P4}$. For example, when adjusted so as to be $V_{P3} = V_{P4}$ at ASA 200 of a film sensitivity, the output of the amplifier 67 is at the "L" level as $V_{P3} > V_{P4}$ when a film sensitivity is less than ASA 200 and at the "H" level as $V_{P3} \leq V_{P4}$ when ASA 200 or over. The biases for the amplifiers 50, 55 are changed in such a manner that when the output of the amplifier 67 is at the "L" level, the first inverting input terminals thereof are selected and when at the "H" level, the second inverting input terminals thereof are selected.

Further, the supply voltage $V_{DD}$ is applied to the terminal 33 and hence a constant current $I_R$ flows through the collector of the transistor 61 by means of the constant current supply 63. Accordingly, the current $I_R$ flows also through the collectors of the transistors 60, 59 and through the resistors 56, 57 to the terminal 22. As a result, the following voltages $V_{P6}$ and $V_{P7}$ are applied to the first and second inverting input terminals of the amplifier 55 as a decision voltage for the aperture control of the latter:

$$V_{P6} = V_{REF} + I_R \cdot R_{16} \quad (6)$$

$$V_{P7} = V_{REF} + I_P \cdot R_{17} \quad (7)$$

where $R_{16}$, $R_{17}$ represent the resistances of the resistors 56, 57, respectively.

Subsequently, when a shutter and a film are wound, the trigger signal terminal 25 turns to the "H" level and the memory signal terminal 48 also turns to the "H" level. When the camera is directed to an object being photographed, light passing through the taking lens 7 and the diaphragm member 14 which is fully opened is reflected by the mirror 4 and received by the transducer element 6, as shown in FIG. 1. As a result, the transducer element 6 produces a light current $I_P$ corresponding to the amount of the light received thereby. The transistor 23, to which the "H" level signal at the terminal 25 is now applied at its base, is in the activated condition so that a feedback loop is formed by the amplifiers 21, 28. As a result, the reference voltage $V_{REF}$ is applied to the non-inverting input terminal of the amplifier 28 and hence the capacitor 29 is charged to the reference voltage $V_{REF}$.

When the photocurrent $I_P$ is produced in the transducer element 6, the $I_P$ flows also from the anode of the diode 26 to the cathode thereof. Accordingly, a voltage $V_{P5}$ at the cathode of the diode 26 is given as follows:

$$V_{P5} = V_{REF} - \frac{kT}{q} \ln \frac{I_P}{I_{S1}} \quad (8)$$

where k is the Boltzmann constant, T is an absolute temperature, q is the charge of an electron and $I_{S1}$ is the saturation current in the opposite direction of the diode 26.

The voltage $V_{P5}$ is applied to the non-inverting input terminal of the amplifier 44. A current equal to the current $I_{SV}$ which flows through the collector of the transistor 41 flows through the collector of the transistor 42 and the current $I_{SV}$ also flows through the diode 45. Accordingly, an output voltage $V_{P8}$ of the amplifier 44 is defined as follows:

$$V_{P8} = V_{P5} + \frac{kT}{q} \ln \frac{I_{SV}}{I_{S2}} \quad (9)$$

where $I_{S2}$ is the saturation current in the opposite direction of the diode 45. Since the diode 45 has the same properties as that of the diode 26, then $I_{S1} = I_{S2}$ and substituting the equation (8) for the equation (9) the following is obtained.

$$V_{P8} = V_{REF} + \frac{kT}{q} \ln \frac{I_{SV}}{I_P} \quad (10)$$

As will be clear from the equation (10), the output voltage $V_{P8}$ of the amplifier 44 is an information voltage for a brightness Bv of the object being photographed plus a film sensitivity Sv.

At this time, since the analog switch 46, to which the "H" level signal from the terminal 48 is applied at its control terminal, is in the activated condition, the voltage $V_{P8}$ is applied through the analog switch 46 to the non-inverting input terminal of the amplifier 49 to charge the capacitor 47.

Then, when the shutter is released, the memory signal $S_M$ turns to the "L" level and the analog switch 46 turns off. At this time, the output voltage $V_{P8}$ of the amplifier 44 is stored in the capacitor 47 as a full-open photometry value and the stored voltage is produced at the output terminal of the amplifier 49. The voltage $V_{P9}$ at the output terminal of the amplifier 49 is derived from the equation (10) as follows:

$$V_{P9} = V_{REF} + \frac{kT}{q} \ln \frac{I_{SV}}{I_{P0}} \tag{11}$$

where $I_{P0}$ is a photocurrent at the time of the full-open photometry.

The voltage $V_{P9}$ which is held at the time of the full-open photometry is applied to the non-inverting input terminal of the amplifier 50 and the voltage $V_{P8}$ is applied through the resistors 51, 53 to the first and the second inverting input terminals of the amplifier 50, respectively. Accordingly, an output voltage $V_{P10}$ of the amplifier 50 can be obtained from the equations (10) and (11) as follows: When the first inverting input terminal is selected, $$V_{P10} = V_{P9} - \frac{R_{12}}{R_{11}} (V_{P9} - V_{P8}) \tag{12}$$

$$= V_{REF} + \frac{kT}{q} \ln \frac{I_{SV}}{I_{P0}} + \frac{R_{12}}{R_{11}} \cdot \frac{kT}{q} \ln \frac{I_{P0}}{I_P}$$

When the second inverting input terminal is selected, $$V_{P10} = V_{REF} + \frac{kT}{q} \ln \frac{I_{SV}}{I_{P0}} + \frac{R_{14}}{R_{13}} \cdot \frac{kT}{q} \ln \frac{I_{P0}}{I_P} \tag{13}$$

where $R_{11}$ to $R_{14}$ are the resistances of the resistors 51 to 54, respectively.

When the output voltage $V_{P10}$ of the amplifier 50 is introduced to the non-inverting input terminal of the amplifier 55, the voltage $V_{P10}$ is compared with the decision voltage $VP_6$ when the first inverting input terminal is selected and the decision voltage $V_{P7}$ when the second one is selected. When the voltage $V_{P10}$ is higher than the voltage $VP_6$, $V_{P7}$, an output of the amplifier 55 turns to the "H" level and the open aperture is obtained since the electromagnet 58 for the aperture control is not energized. When the voltage $V_{P10}$ is lower than the voltage $V_{P6}$, $V_{P7}$, the output of the amplifier 55 turns to the "L" level and a stop-down operation is initiated after the shutter is released since the electromagnet 58 is energized. Upon the initiation of the stop-down operation, a voltage difference $\Delta V$ corresponding to a variation in a photocurrent equivalent to a stop-down value $\Delta A_V$ is produced between the output voltage $V_{P8}$ of the amplifier 44 and the output voltage $V_{P9}$ of the amplifier 49. The voltage difference $\Delta V$ can be expressed as follows:

$$\Delta V = \frac{kT}{q} \ln \frac{I_{P0}}{I_P} \tag{14}$$

where $I_{P0}$ is a photocurrent at the time of the full-open photometry, $I_P$ is a photocurrent while in the stop-down operation, and $I_{P0} > I_P$. It follows from the equation (14) that an inclination of the program characteristic line is determined by the value $\Delta V$, namely the amplification factors $$\frac{R_{12}}{R_{11}}, \frac{R_{14}}{R_{13}}$$

(both 1 and less) of the amplifier 50, as shown in equations (12), (13). In addition, the initiation of the stop-down operation is determined by the decision voltages $V_{P6}$, $V_{P7}$ at the inverting input terminal of the amplifier 55 and the second terms of the equations (12), (13), namely $$\frac{kT}{q} \ln \frac{I_{SV}}{I_{P0}}.$$

Figure 3:
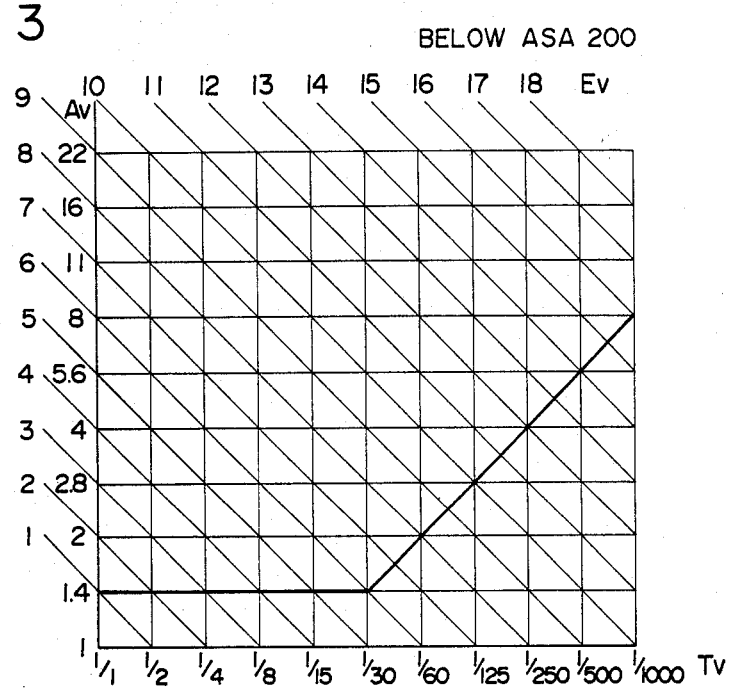
FIG. 3 is a program characteristic diagram of an aperture control using the exposure controller shown in FIG. 2 when a film sensitivity is low.
Figure 4:
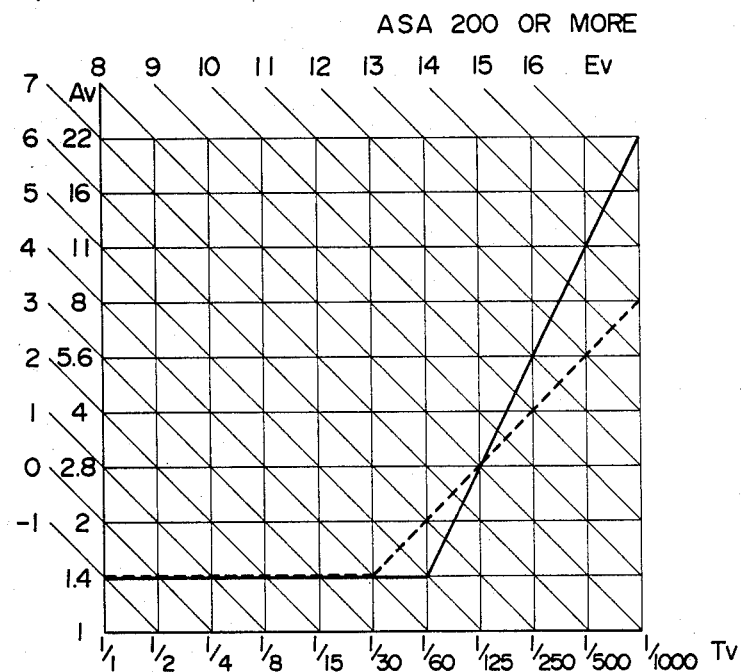
FIG. 4 is a program characteristic diagram of an aperture control using the exposure controller shown in FIG. 2 when a film sensitivity is high.

At this time, when the variable resistor 43 for setting information for a film sensitivity is set to ASA 100 of a film sensitivity, an output of the amplifier 67 is at the "L" level and the amplifiers 50, 55 select the first inverting input terminals. Thus, the program characteristic for the aperture control by the amplifiers 50, 55 are as shown in FIG. 3. When a film sensitivity is set to ASA 400, the output of the amplifier 67 is at the "H" level and the amplifiers 50, 55 select the second inverting input terminal. Thus, the program characteristic for the aperture control by the amplifiers 50, 55 are as shown in FIG. 4. Specifically, for ASA 100, the decision voltage $V_{P6}=I_R \cdot R_{16}$ (on the basis of the reference voltage $V_{REF}$) as a bias for initiating the stop-down operation and $$\frac{R_{12}}{R_{11}}$$

as an inclination of the program characteristic line are automatically selected. Also, for ASA 400, the decision voltage $V_{P7}=I_R \cdot R_{17}$ as a bias for initiating the stop-down operation and $$\frac{R_{14}}{R_{13}}$$

as an inclination of the program characteristic line are automatically selected. By way of example, in FIG. 3, when ASA = 100 and the setting is made in such a manner that the stop-down operation is initiated at an exposure value Ev = 6 by adjusting the decision voltage $V_{P6}=I_R \cdot R_{16}$, the stop-down operation in ASA = 400 will be initiated at an Ev = 4. At this time, as shown in FIG. 4, when the decision voltage $V_{P7}=I_R \cdot R_{17}$ is set to the smaller side by 1 Ev than the decision voltage $VP_6$, the setting can be made in such a manner that the stop-down operation is initiated at a point Ev = 7 in ASA 100 or at a point Ev = 5 in ASA 400. In addition, the program shown in FIG. 3 is a combination program in which 0.5 Ev in the time value Tv and 0.5 Ev in the aperture value Av vary with a variation of 1 in an inclination of the program characteristic line or a variation of 1 Ev in the exposure value. This is achieved by setting the amplification factor $$\left(\frac{R_{12}}{R_{11}}\right)$$

of the amplifier 50 to ½. Assuming that the program characteristic line of ASA 400 has the inclination as set forth above, the inclination is shown with a dotted line in FIG. 4. However, in consideration of making a good use of the film properties of ASA 400 and the best combination of a shutter speed Tv and an aperture Av, the program characteristic line of inclination as shown in FIG. 4 with a solid line is obtained by setting an amplification factor $$\left(\frac{R_{14}}{R_{13}}\right)$$

of the amplifier 50 to ⅔.

Since the voltage $V_{P10}$ increases as the diaphragm member 14 is gradually stopped down by the electromagnet 58 for the aperture control, with a film of ASA 100 used an output of the amplifier 55 turns to the "H" level when the output voltage $V_{P10}$ of the amplifier 50 reaches the decision voltage $VP_6$ and with a film of ASA 400 used an output voltage of the amplifier 55 turns to the "H" level when the output voltage $V_{P10}$ reaches the decision voltage $V_{P7}$. Thus, the aperture control is completed. At this time, in case of a film of ASA 100, the following equation is derived from the equations (6) and (12):

$$\frac{kT}{q}\ln\frac{I_{SV}}{I_{P0}} + \frac{R_{12}}{R_{11}} \cdot \frac{kT}{q}\ln\frac{I_{P0}}{I_{P'}} = I_R \cdot R_{16} \quad (15)$$

In case of a film of ASA 400, the following equation is derived from the equations (7) and (13):

$$\frac{kT}{q}\ln\frac{I_{SV}}{I_{P0}} + \frac{R_{14}}{R_{13}} \cdot \frac{kT}{q}\ln\frac{I_{P0}}{I_{P'}} = I_R \cdot R_{17} \quad (16)$$

In the equations (15), (16), $I_{P'}$ represents a photocurrent at the time the stop-down operation is completed. Both equations (15), (16) indicate the criteria for judging the completion of the stop-down operation.

When the stop-down control of the diaphragm member 14 is completed, the movable mirror 3 is raised to initiate the running of the first shutter blind 12. Whereby, the trigger signal $S_0$ at the "L" level is applied to the terminal 25 to turn the transistor 23 off. At this time, since the feedback loop of the amplifier 21 is broken, no photocurrent flows through the diode 26 and a photocurrent $I_P$ which is caused by the photometry of light reflected by the film surface flows through the capacitor 29. Accordingly, the integration is initiated from the time the transistor 23 turns off and the capacitor 29 is charged by the photocurrent $I_P$ to further raise the voltage thereacross over the reference voltage $V_{REF}$. The Voltage Vc across the capacitor 29 is applied from the output terminal of the amplifier 28 to the non-inverting input terminal of the amplifier 30 and is compared with the decision voltage $V_{P2}$ for a shutter speed which is applied to the inverting input terminal of the latter. The voltage Vc can be expressed as follows:

$$V_c = V_{REF} + \frac{1}{C_1}\int I_P dt \quad (17)$$

where $C_1$ represents the capacity of the capacitor 29.

While the voltage Vc is lower than the decision voltage $V_{P2}$, namely, the relation $$\frac{1}{C_1}\int I_P dt < I_{SV} \cdot R_3$$

from the equations (3) and (17) holds, an output of the amplifier 30 is at the "L" level so that the electromagnet 32 is in the energized condition to lock a second shutter blind. Then, the voltage Vc is raised with an inclination indicated by the equation (17) until it reaches the decision voltage. When the relation $$\frac{1}{C_1}\int I_P dt \geq I_{SV} \cdot R_3$$

holds, the output of the amplifier 30 turns to the "H" level. Thereupon, the magnet 32 is deenergized and the locking of the second shutter blind is released, resulting in that the latter runs and the exposure is completed.

What is claimed is:

1. A program type automatic exposure controller for use in a camera, comprising:
   photometry means for measuring light from an object being photographed which is transmitted through a taking lens and an aperture;
   program constant means for determining a program constant to conduct an aperture control operation in response to a value measured by said photometry means and information representing a film sensitivity;
   aperture control means for making a stop-down operation of the aperture in response to an output of said program constant means;
   switching means for switching a program constant in said program constant means by selecting an inclination of a predetermined program characteristic and a starting point of the stop-down operation suitable for each of a plurality of film sensitivity information regions which are formed by dividing a range for setting information of a film sensitivity, in response to a selection signal which is produced in said each of film sensitivity information regions;
   and shutter control means for controlling a shutter by integrating photometric values from said photometry means after termination of the stop-down operation by means of said aperture control means.

2. A program type automatic exposure controller according to claim 1, in which said photometry means measures light which is transmitted through a half-mirror portion of a movable mirror for observation and is reflected by a second mirror for photometry which is disposed behind the movable mirror, before a shutter releasing while the movable mirror is lowered and measures light which is reflected by a film surface exposed as a shutter blind runs after the shutter is released when the movable mirror is raised.

3. A program type automatic exposure controller for a camera, comprising:
   photometry means for measuring light from an object being photographed, which light passes through the taking lens and aperture of the camera;

adjustable means for generating an output representing a film sensitivity;

first combining means responsive to said photometry means and said adjustable means for generating an output which is a function of film sensitivity and image brightness;

second means for combining the output of the combining means and said photometry means for generating a composite signal;

said second means altering the output of said combining means according to a first program factor when in a first state and for altering the output of said combining means according to a second program factor when in a second state;

control means coupled to said adjustable means being responsive to a film sensitivity in a first predetermined range for controlling said combining means to operate in said first state and for controlling said combining means to operate in said second state when said film sensitivity lies within a second predetermined range;

means responsive to said control means for comparing the output of said combining means with a first threshold for stopping down the lens aperture and for comparing the output of said combining means with a second threshold for stopping down the lens aperture when said film sensitivity lies in respectively said first and second predetermined ranges.

* * * * *

UNITED STATES PATENT AND TRADEMARK OFFICE
CERTIFICATE OF CORRECTION

PATENT NO. : 4,512,648
DATED : April 23, 1985
INVENTOR(S) : Kazunori Mizokami

It is certified that error appears in the above-identified patent and that said Letters Patent is hereby corrected as shown below:

Column 1, line 53 after "merely" insert --by--.

Column 2, line 48 change "therafter" to --thereafter--.

Column 6, equation (7) change "$I_P$" to --$I_R$--.

Column 7, line 60 change "AV" to --$\Delta V$--.

Column 8, line 55 change "in" to --for--.

Column 9, line 26 change "$VP_6$" to --$V_{P6}$--.

Signed and Sealed this

Twenty-seventh Day of August 1985

[SEAL]

Attest:

DONALD J. QUIGG

Attesting Officer      Acting Commissioner of Patents and Trademarks